US012695226B2

(12) United States Patent
Liu et al.

(10) Patent No.: US 12,695,226 B2
(45) Date of Patent: Jul. 28, 2026

(54) ELECTRICAL CONNECTOR WITH IMPROVED PROTECTIVE MEMBERS

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventors: Meng Liu, Kunshan (CN); Bao-Can Guo, Zhengzhou (CN)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 364 days.

(21) Appl. No.: 18/430,465

(22) Filed: Feb. 1, 2024

(65) Prior Publication Data

US 2024/0275102 A1 Aug. 15, 2024

(30) Foreign Application Priority Data

Feb. 9, 2023 (CN) ........................ 202320163800.X

(51) Int. Cl.
*H01R 12/73* (2011.01)
*H01R 12/72* (2011.01)

(52) U.S. Cl.
CPC ......... *H01R 12/737* (2013.01); *H01R 12/721* (2013.01)

(58) Field of Classification Search
None
See application file for complete search history.

(56) References Cited

U.S. PATENT DOCUMENTS 7,699,644 B2 4/2010 Te
10,439,311 B2 10/2019 Te
12,482,974 B2 * 11/2025 Lu .......................... H01R 12/79
12,500,379 B2 * 12/2025 Lu .......................... H01R 13/64

FOREIGN PATENT DOCUMENTS

CN 205429312 U 8/2016
CN 206004071 U 3/2017
CN 208797209 U 4/2019
CN 209709219 U 11/2019
CN 209993779 U 1/2020

* cited by examiner

*Primary Examiner* — Ross N Gushi
(74) *Attorney, Agent, or Firm* — Ming Chieh Chang

(57) ABSTRACT

An electrical connector includes: an insulating housing having a first mating face and a second mating face, a first slot through the first mating face, and a second slot through the second mating face, the second mating face protruding beyond the first mating face; a first set of terminals extending into the first slot; a first protective member and a second protective member extending into the first slot and attached to opposite end insides of the first slot; and a third protective member and a fourth protective member extending into the second slot and attached to opposite end insides of the second slot, wherein the second protective member and the third protective member are connected by a first metal plate, the second protective member extends downward from the first metal plate, and the third protective member extends upward from the first metal and then bends into the second slot.

17 Claims, 13 Drawing Sheets

ELECTRICAL CONNECTOR WITH IMPROVED PROTECTIVE MEMBERS

BACKGROUND OF THE INVENTION

Field of the Invention

The present invention relates generally to an electrical connector, and particularly to a card edge electrical connector.

Description of Related Arts

China Patent No. CN217158696U discloses an electrical connector, which includes an insulating housing along a longitudinal direction, a plurality of conductive terminals retained in the insulating housing. The insulating housing has a plurality of slots opening through a mating surface and extending along the longitudinal direction. The slots are used to receive an electronic card, the conductive terminals extend to the slots to electrically connect with the electronic card. Due to a small thickness and a long length of the electronic card, the terminals may be damaged due to a rotation or a tilt of the electronic card during an insertion of the card. When the electronic card is inserted violently or at an angle, it will also cause damage to weaker longitudinal ends of the slots.

An improved electrical connector is desired.

SUMMARY OF THE INVENTION

An object of the present invention is to provide an electrical connector with improved protective members.

To achieve the above-mentioned object, an electrical connector comprises: an insulating housing extending along a longitudinal direction and having a first mating face and a second mating face, a first slot opening through the first mating face, and a second slot opening through the second mating face, the first slot and the second slot being arranged along the longitudinal direction, the second mating face protruding beyond the first mating face; a first set of terminals extending into the first slot; a second set of terminals extending into the second slot; a first protective member and a second protective member extending into the first slot and attached to opposite end insides of the first slot; and a third protective member and a fourth protective member extending into the second slot and attached to opposite end insides of the second slot, wherein the second protective member and the third protective member are connected by a first metal plate, the second protective member extends downward from the first metal plate, and the third protective member extends upward from the first metal and then bends into the second slot.

Other advantages and novel features of the invention will become more apparent from the following detailed description of the present embodiment when taken in conjunction with the accompanying drawings.

DETAILED DESCRIPTION OF THE PREFERRED EMBODIMENT

Figure 1:
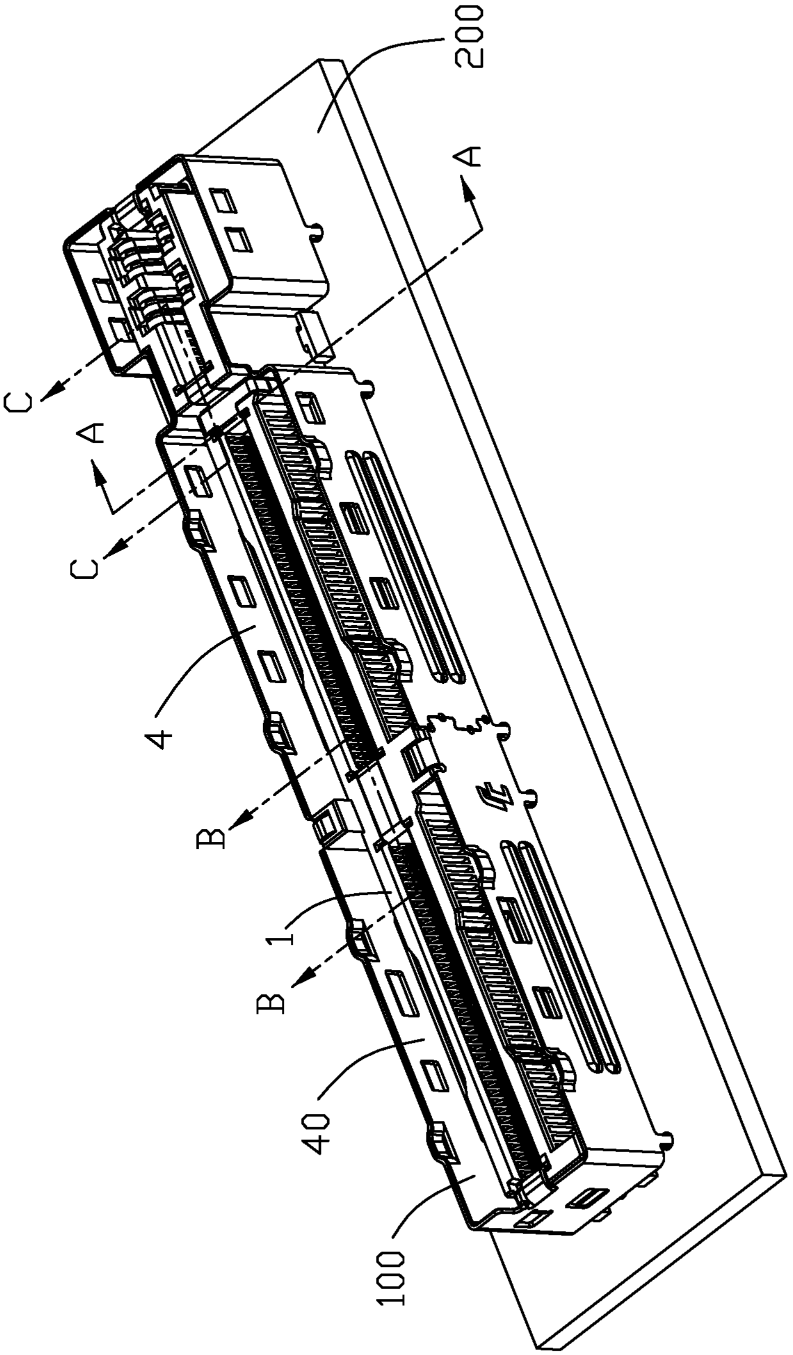
FIG. 1 is a perspective view of an electrical connector mounted on a printed circuit board (PCB) according to an embodiment of the present invention.

Reference will now be made to the drawing figures to describe the preferred embodiment of the present invention in detail.

Referring to FIGS. 1-6, an electrical connector 100 of the present invention can be mounted on PCBs. The electrical connector 100 comprises an insulating housing 1 extending along a longitudinal direction and comprising a first slot 11 with a first end inside 111 to a second end inside 112 in the longitudinal direction and a second slot 12 with a third end inside 113 to a fourth end inside 114, two sets of terminals 2 disposed in the insulating housing 1, a first protective member 31 extending into the first slot 11 and attached on the first end inside 111 of the first slot 11, a second protective member 32 extending into the first slot 11 and attached on the second end inside 112 of the first slot 11, a third protective member 33 extending into the second slot 12 and attached on the third end inside 113 of the second slot 12, and a fourth protective member 34 extending into the second slot 12 and attached on the fourth end inside 114 of the second slot 12. The first protective member, second protective member, third protective member and fourth protective member are made from metal plates. The first slot 11 and the second slot 12 are arranged along the longitudinal direction and opening through corresponding mating faces defined on the insulating housing 1. A second mating face 102 around the second slot 12 protruding beyond a first mating face 101 around the first slot 11. The first mating face 101 and the second mating face 102 define a shoulder 103 due to the height difference. The first mating face 101, the shoulder 103 and the second mating face 102 are arranged in a step. The two sets of terminals 2 respectively comprise elastic contacting portions 20 extending into the first slot 11 and the second slot 12. One or more mating connectors with plug card or electronic cards (not shown) can be inserted into the first slot 11 and the second slot 12. The protective members can protect the weaker longitudinal ends of the first slot 11 and second slot 12, thereby preventing the insulating housing 1 from being damaged when the mating connector or electronic card is inserted violently or tiltedly. It is beneficial to increase the service life of the electrical connector 100. At the same time, the first, second, third and fourth protective members are also bent upward and extend to the mating face to further enhance the protective effect.

Referring to FIGS. 4-7 and 13, the second protective member 32 and the third protective member 33 are connected by a first metal plate 301. The second protective member 32 extends downward from the first metal plate 301 into the first slot 11. The third protective member 33 extends upwards and then bends downward and extends into the second slot 12. The first metal plate 301 comprises a flat plate portion 311 attached to the first mating face 101. The second protective member 32 extends downward from one end of the flat plate portion 311. The third protective member 33 extends upward from the other end of the flat plate portion 311 along the shoulder 103 to the second mating face 102 and then bends downward. The third protective member 33 has an inverted U-shaped structure to fit the structure of the steps.

Figure 4:
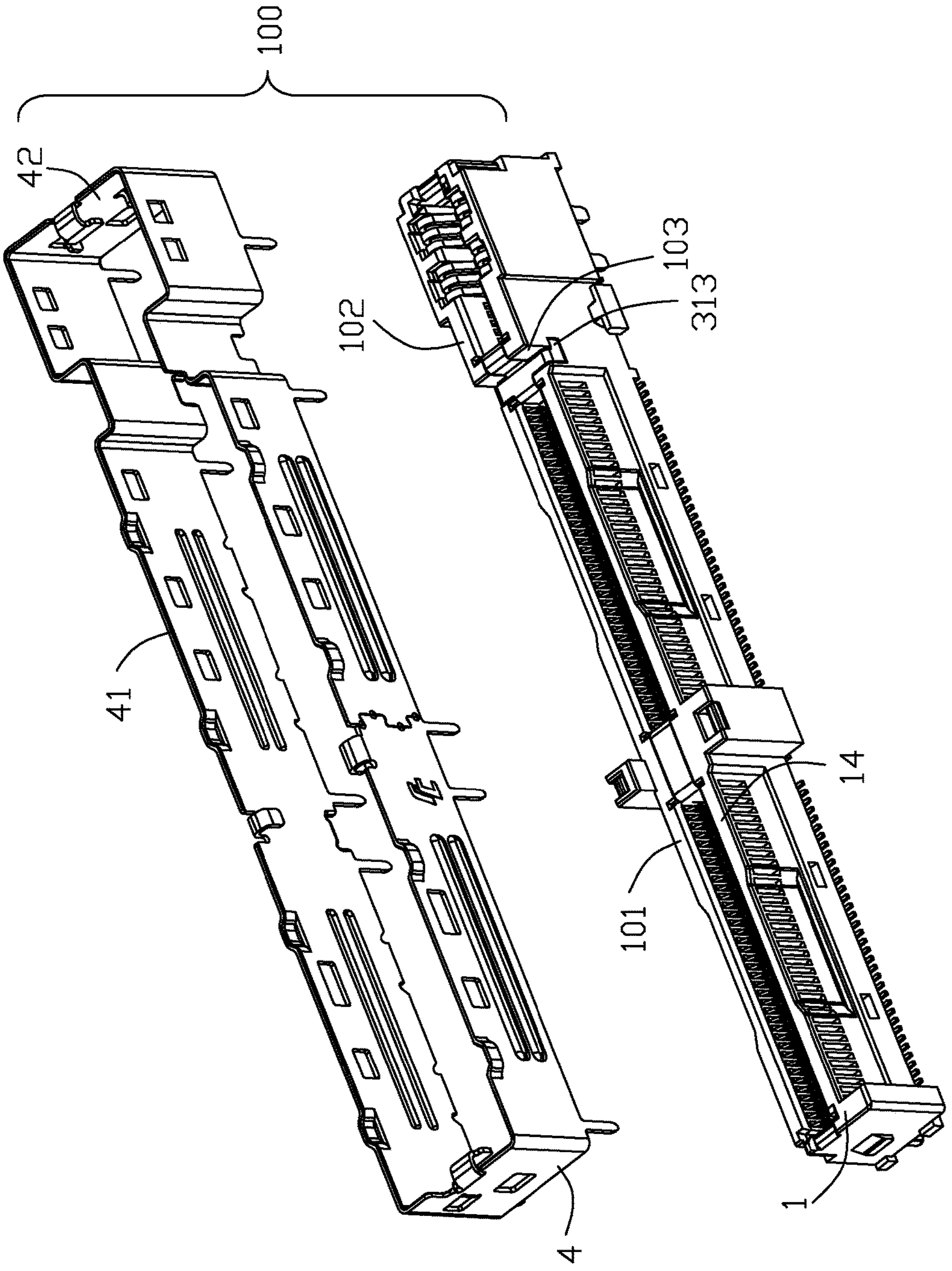
FIG. 4 is an exploded perspective view of the electrical connector of FIG. 2.

Referring to FIG. 4, in order to increase the holding force between the first metal plate 301 and the insulating housing 1. A retention portion 312 bends from each side of the flat plate portion 311, and is fixed in a retention groove 104 of the insulating housing 1. The retention groove 104 is recessed from the outer surface of the insulating housing 1 and has a shape corresponding to the retention portion 312. The flat plate portion 311 is attached on the first mating face 101 corresponding to the first slot 11. An end 313 of the retention portion 312 extends below the second mating face 102 corresponding to the second slot 12 to limit the first metal plate 301 in an up and down direction perpendicular to the longitudinal direction. The electrical connector 100 comprises a metal shell 4 surrounding the outside of the insulating housing 1. The fourth protective member 34 unitarily extends from the metal shell 4. The metal shell 4 is close to the insulating housing 1 at a position corresponding to the end 313 and is laterally crimped to the end 313, thereby increasing the holding effect of the retention portion 312 and the insulating housing 1.

Figure 2:
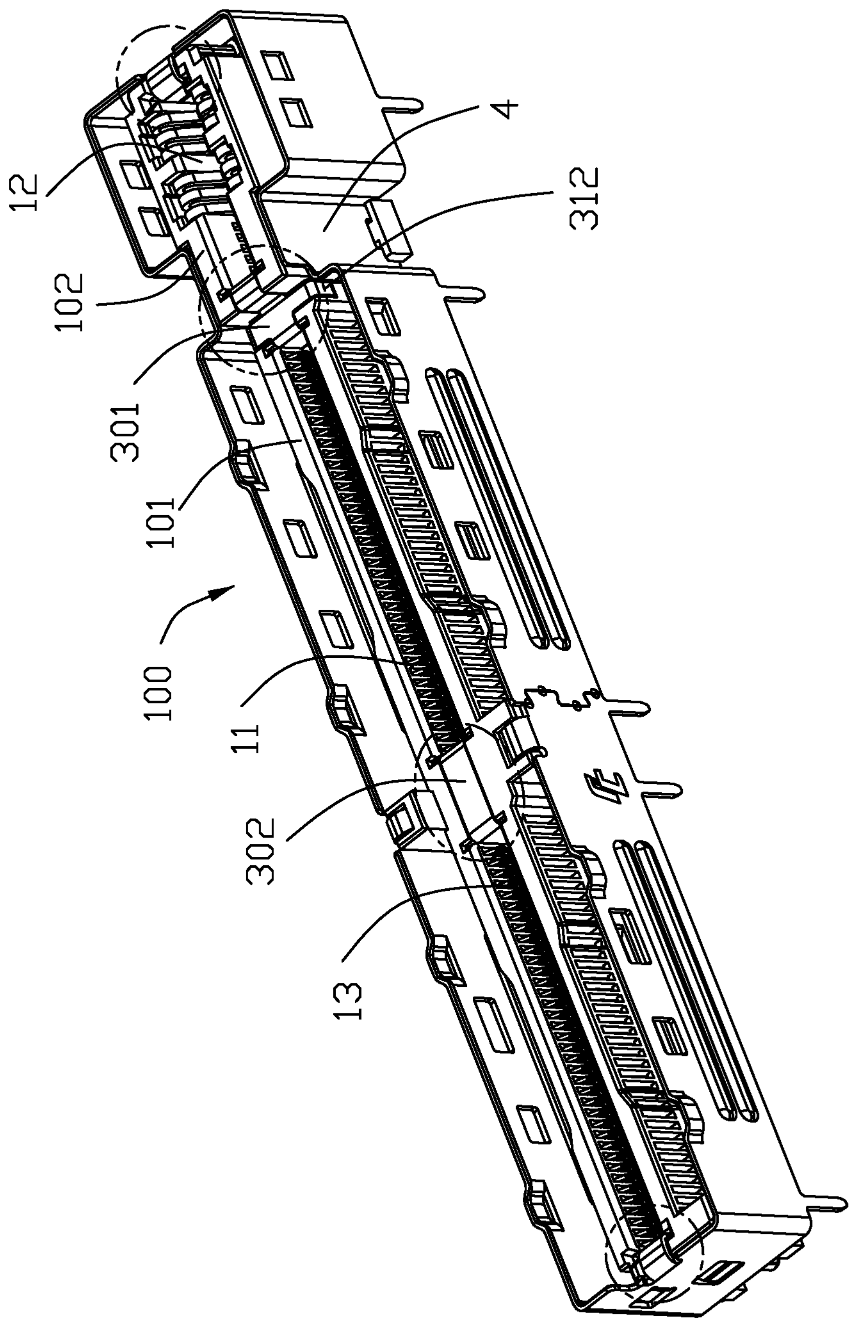
FIG. 2 is a top perspective view of the electrical connector in FIG. 1.
Figure 3:
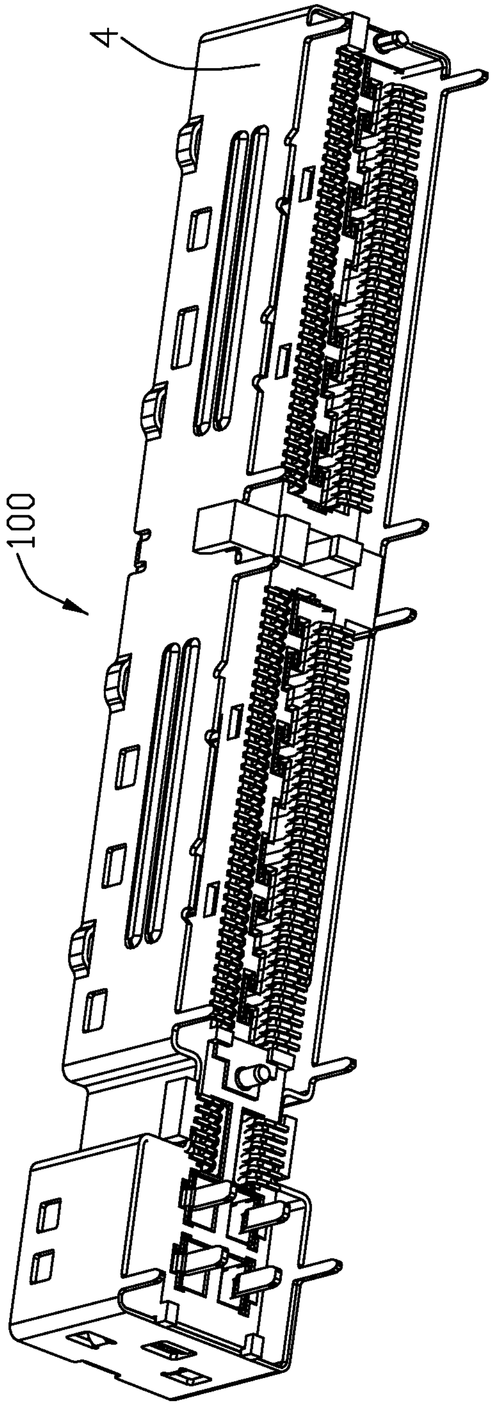
FIG. 3 is a bottom perspective view of the electrical connector in FIG. 2.
Figure 9:
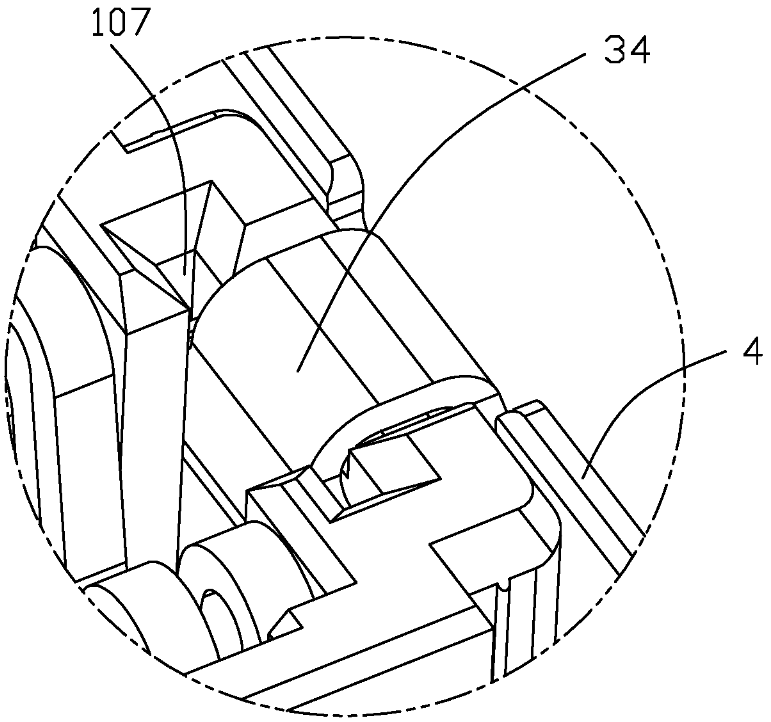
FIG. 9 is a partial enlarged perspective view of the fourth protective member in FIG. 2.
Figure 10:
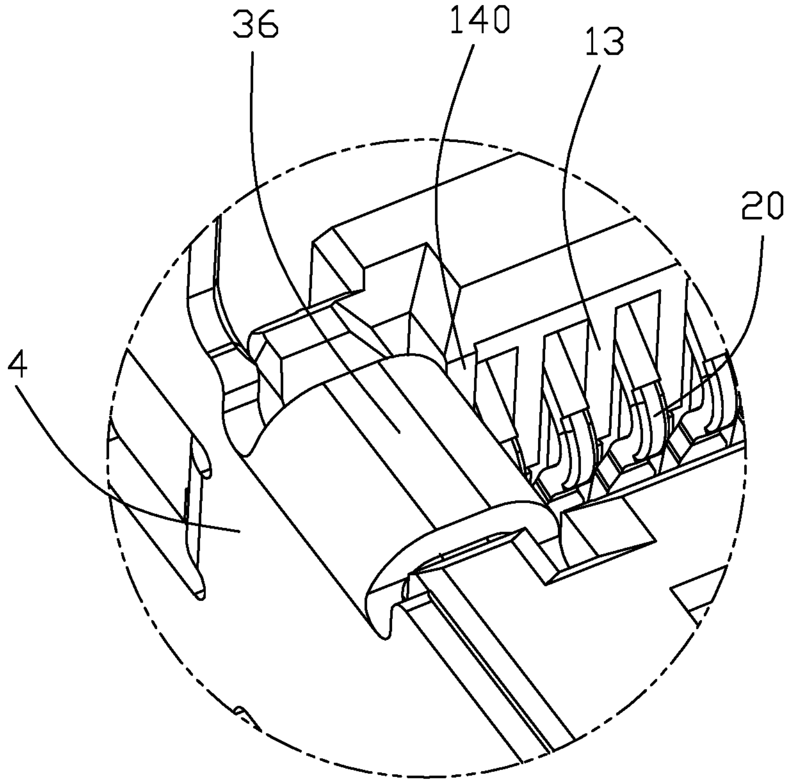
FIG. 10 is a partial enlarged perspective view of the sixth protective member in FIG. 2.
Figure 11:
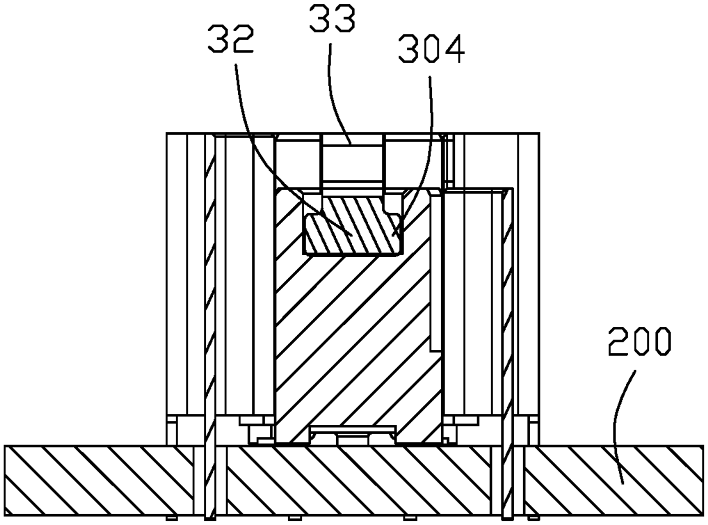
FIG. 11 is a cross-sectional view of the electrical connector taken along line A-A in FIG. 1.

Referring to FIGS. 2 and 9-10, one or two slots can be set on the first mating face 101. When the first mating face 101 has only the first slot 11, the first protective member 31 and the fourth protective member 34 extend from the metal shell 4. Referring to FIGS. 2-5, in this embodiment, the first mating face 101 has a third slot 13, specifically, the insulating housing 1 has a third slot 13 located at another ends of the first slot 11 opposite to the second slot 12 in the longitudinal direction, a fifth protective member 35 extends into the third slot 13 and attached to one end inside of the third slot 13, and a sixth protective member 36 extends into the third slot 13 and attached to another end inside of the third slot 13. The fifth protective member 35 and the first protective member 31 are united together. The fourth protective member 34 and the sixth protective member 36 extend from the metal shell 4. In other embodiments, when the first mating face 101 has one slot, the first and fourth protective members adjacent to the metal shell 4 can be separated from the metal shell 4 and installed on the insulating housing 1. When the first mating face 101 has two slots, the sixth and fourth protective members adjacent to the metal shell 4 can be separated from the metal shell 4 and installed on the insulating housing 1.

Figure 5:
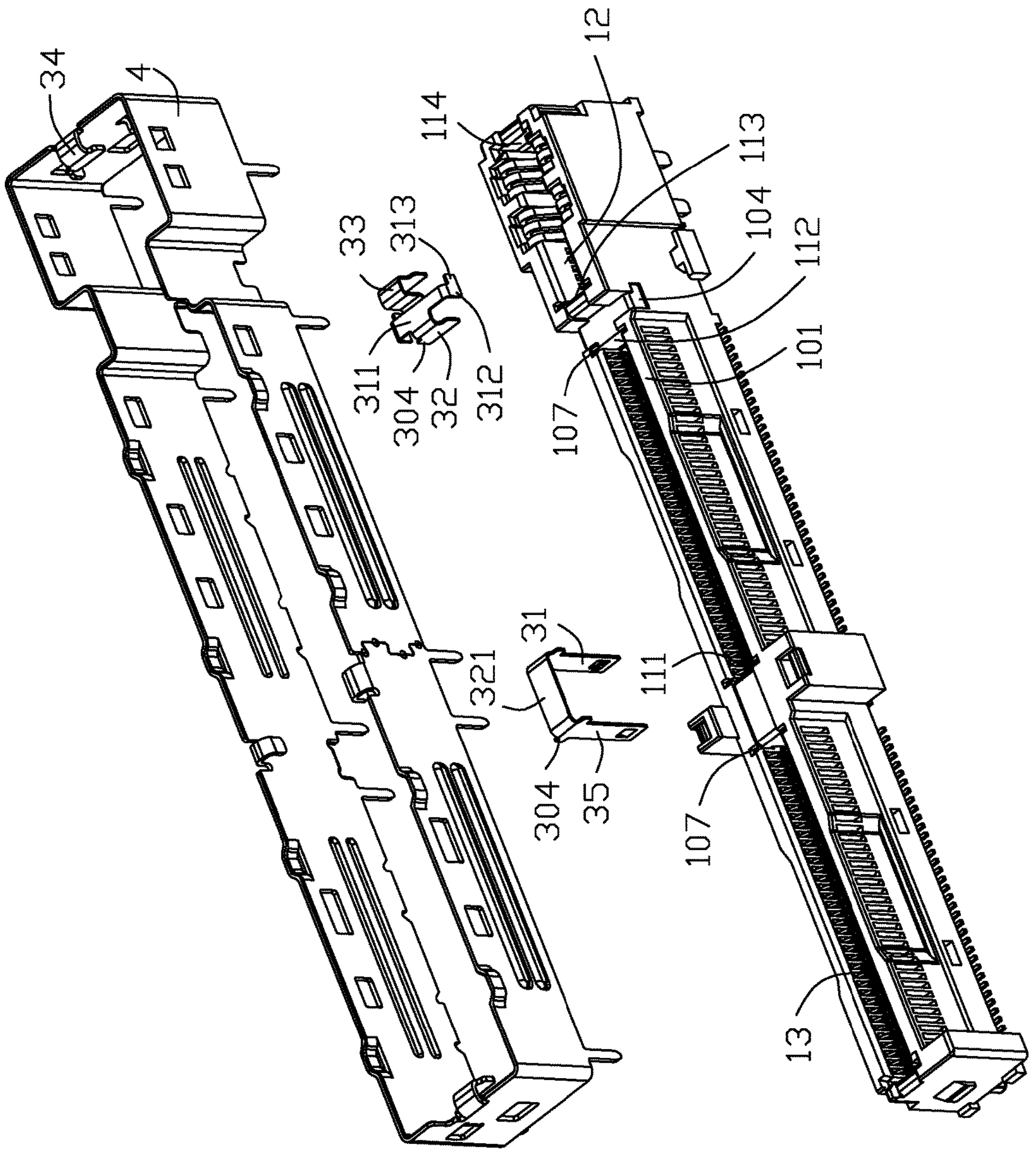
FIG. 5 is a further exploded perspective view of the electrical connector in FIG. 4.
Figure 6:
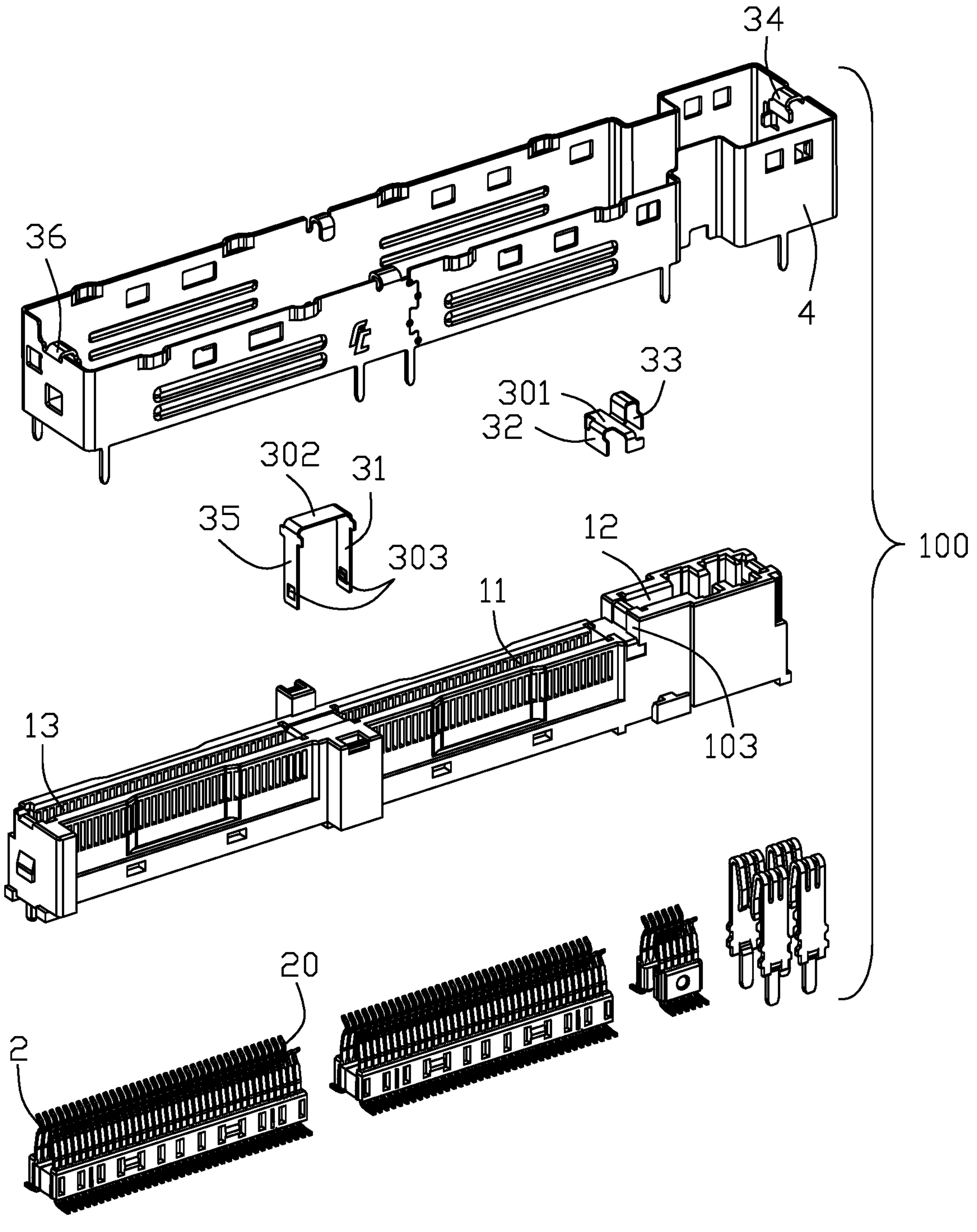
FIG. 6 is a further exploded perspective view of the electrical connector in FIG. 5.
Figure 7:
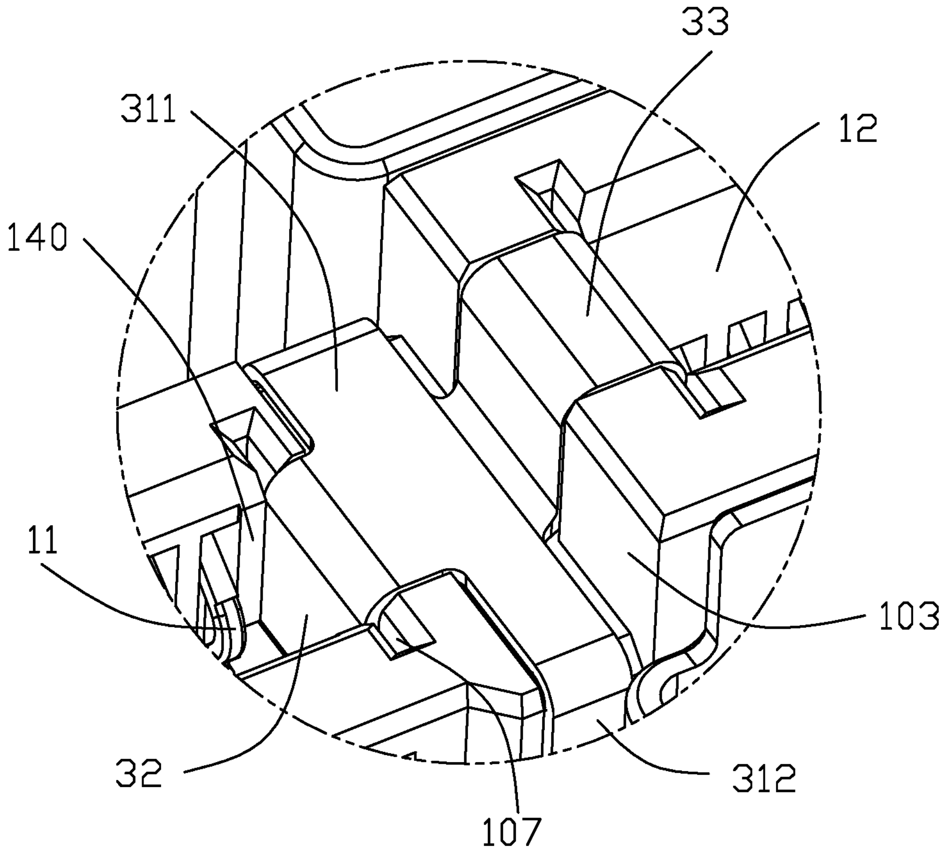
FIG. 7 is a partial enlarged perspective view of the first metal plate in FIG. 2.
Figure 8:
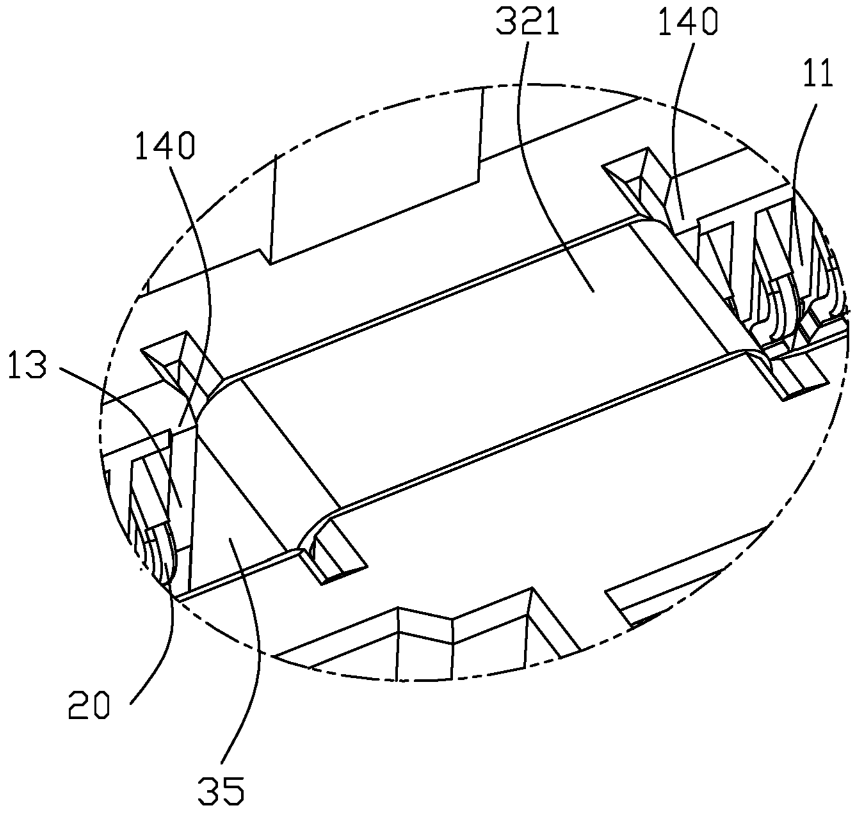
FIG. 8 is a partial enlarged perspective view of the second metal plate in FIG. 2.
Figure 12:
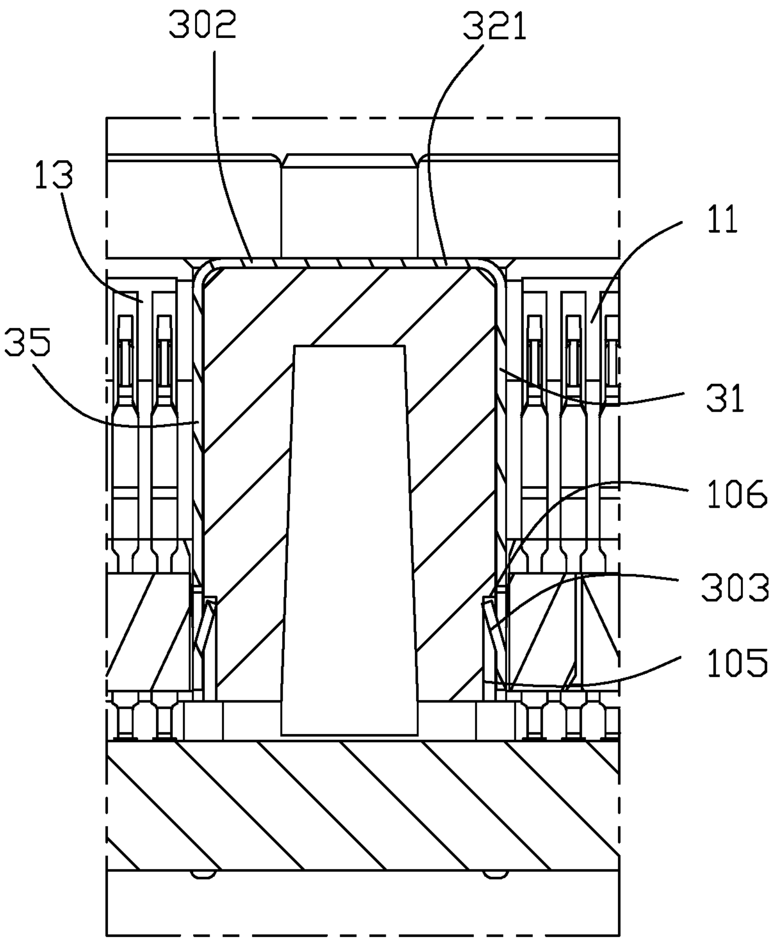
FIG. 12 is a cross-sectional view of the electrical connector taken along line B-B in FIG. 1.
Figure 13:
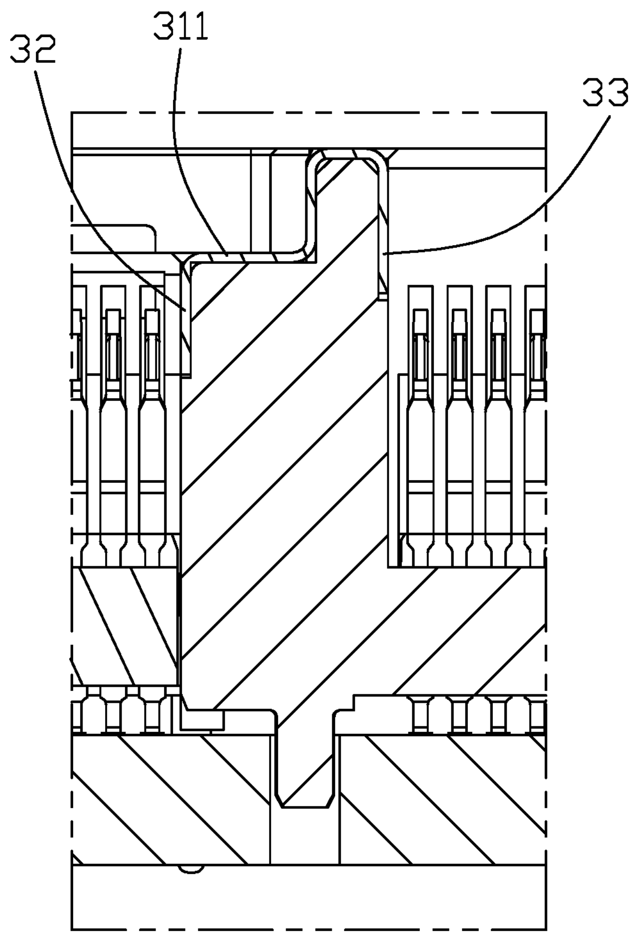
FIG. 13 is a cross-sectional view of the electrical connector taken along line C-C in FIG. 1.

Referring to FIGS. 5-6 and 8, the first protective member 31 and the fifth protective member 35 are connected by a second metal plate 302. The second metal plate 302 comprises a bridge portion 321 attached to the first mating face 101. One end of the second metal plate 302 extends downward into the first slot 11 to form the first protective member 31. The other end of the second metal plate 302 extends downward into the third slot 13 to form the fifth protective member 35. Referring to FIG. 12, the first protective member 31 and the fifth protective member 32 have upwardly inclined butting pieces 303. The butting pieces 303 abut in grooves 105 defined in the insulating housing 1. The groove 105 is formed by being recessed inwardly from the opposite interior walls of the second slot 12 and the third slot 13. The groove 105 comprises a top surface 106. The first protective member 31 and the fifth protective member 35 are assembled to the insulating housing 1 from top to bottom. The butting piece 303 abuts upwardly on the top surface 106, which can prevent the first protective member 31 and the fifth protective member 35 from falling off.

Referring to FIGS. 1 and 4-5, the insulating housing 1 comprises a pair of side walls 14 extending in the longitudinal direction and surrounding the first slot 11, the second slot 12 and the third slot 13. The metal shell 4 comprises a pair of side plates 41 located outside the pair of side walls 14 and a pair of end plates 42 connecting two ends of the pair of side plates 41. The pair of end plates 42 are respectively attached to two longitudinal ends of insulating housing 1. A mating groove 40 used to align with mating features of the mating connector is formed between the side wall 14 and the side plate 41. Each protective member comprises holding portions 304 protruding at both lateral ends. Each slot includes holding grooves 107 for receiving the holding portions 304. Referring to FIGS. 7-10, each side wall 14 has at least two pairs of convex portions 140 extending correspondingly toward each other to the first slot 11, the second slot 12 or the third slot 13. Each pair of the convex portions 140 is located at both ends of the first slot 11, the second slot 12 or the third slot 13. The distance between each pair of the convex portions 140 is smaller than the distance between the pair of the side walls 14. The set of terminals 2 are located between the two pairs of convex portions 140. Due to the small thickness and long length of the electronic card or the tongue plate of the mating connector, the terminals 2 may be damaged due to the rotation or tilt of the electronic card or the tongue plate during insertion. The convex portions 140 can limit the range of movement of the tongue plate or the electronic card, which is helpful to prevent the terminals 2 from being deformed or damaged due to being squeezed.

The above-mentioned embodiments are only preferred embodiments of the present invention, and should not limit the scope of the present invention, any simple equivalent changes and modifications made according to the claims of the present invention and the contents of the description should still belong to the present invention.

The invention claimed is:

1. An electrical connector comprising:

an insulating housing extending along a longitudinal direction and comprising a first slot with a first end inside to a second end inside in the longitudinal direction and a second slot with a third end inside to a fourth end inside, the first slot and the second slot being arranged along the longitudinal direction and opening through corresponding mating faces defined on the insulating housing, the mating face around the second slot protruding beyond the mating face around the first slot;

two sets of terminals disposed in the insulating housing and comprising elastic contacting portions extending into the first slot and the second slot, respectively;

a first protective member extending into the first slot and attached on the first end inside of the first slot;

a second protective member extending into the first slot and attached on the second end inside of the first slot;

a third protective member extending into the second slot and attached on the third end inside of the second slot; and a fourth protective member extending into the second slot and attached on the fourth end inside of the second slot;

wherein the second protective member and the third protective member are connected by a first metal plate, the second protective member extends downward from the first metal plate into the first slot, the third protective member extends upwards and then bends downward and extends into the second slot.

2. The electrical connector as claimed in claim 1, wherein the first metal plate comprises a flat plate portion attached to the mating face, the second protective member extends downward from the flat plate portion, the third protective member extends upward from the flat plate portion and then bends downward, and the third protective member has an inverted U-shaped structure.

3. The electrical connector as claimed in claim 2, wherein a retention portion bends from each side of the flat plate portion and is fixed in the insulating housing.

4. The electrical connector as claimed in claim 3, wherein the flat plate portion is attached on the mating face corresponding to the first slot.

5. The electrical connector as claimed in claim 4, comprising a metal shell, surrounding and attached to an outside of the insulating housing, and wherein the fourth protective member unitarily extends from the metal shell.

6. The electrical connector as claimed in claim 1, further comprising a fifth protective member and a sixth protective member, and wherein the insulating housing comprises a third slot located at an end of the first slot opposite to the second slot in the longitudinal direction, the fifth protective member extends into the third slot and attached to one end inside of the third slot, the sixth protective member extends into the third slot and attached to another end inside of the third slot, and the fifth and the first protective member are joined together.

7. The electrical connector as claimed in claim 6, comprising a metal shell surrounding and being attached to an outside of the insulating housing, and wherein the fourth protective member and the sixth protective member extend from the metal shell.

8. The electrical connector as claimed in claim 7, wherein the first protective member and the fifth protective member are connected by a second metal plate, and the second metal plate comprises a bridge portion attached to the mating face.

9. The electrical connector as claimed in claim 8, wherein the first protective member and the fifth protective member have upwardly inclined butting pieces, and the butting pieces abut in grooves defined in the insulating housing.

10. The electrical connector as claimed in claim 1, wherein the insulating housing comprises a pair of side walls extending in the longitudinal direction and surrounding the first slot and the second slot, the pair of side walls having at least two pairs of convex portions extending correspondingly toward each other.

11. The electrical connector as claimed in claim 10, wherein the two sets of terminals are located between the at least two pairs of convex portions.

12. An electrical connector comprising:

an insulating housing extending along a longitudinal direction and having a first mating face and a second mating face, a first slot opening through the first mating face, and a second slot opening through the second mating face, the first slot and the second slot being arranged along the longitudinal direction, the second mating face protruding beyond the first mating face;

a first set of terminals extending into the first slot;

a second set of terminals extending into the second slot;

a first protective member and a second protective member extending into the first slot and attached to opposite end insides of the first slot; and a third protective member and a fourth protective member extending into the second slot and attached to opposite end insides of the second slot;

wherein the second protective member and the third protective member are connected by a first metal plate, the second protective member extends downward from the first metal plate, and the third protective member extends upward from the first metal plate and then bends into the second slot.

13. The electrical connector as claimed in claim 12, wherein the first metal plate comprises a flat plate portion attached to the first mating face, the second protective member extends downward from the flat plate portion, the third protective member extends upward from the flat plate portion and then bends downward, and the third protective member has an inverted U-shaped structure.

14. The electrical connector as claimed in claim 13, wherein a retention portion extends downwards from each side of the flat plate portion, and is fixed in a retention groove defined on the insulating housing.

15. The electrical connector as claimed in claim 12, wherein the insulating housing comprises a third slot located at another side of the first slot opposite to the second slot, a fifth protective member and a sixth protective member extend into the third slot and are attached to end sides of the third slot, and the sixth protective member and the first protective member are connected with a second metal plate.

16. An electrical connector comprising:

an insulating housing having a first mating face and a second mating face at different horizontal planes, a first slot through the first mating face, and a second slot through the second mating face;

a first set of terminals disposed in the first slot and a second set of terminals disposed in the second slot; and a metal plate attached on the first mating face;

wherein a first piece extends downward from the metal plate into the first slot and a second piece extends upward from the metal plate and then bends downward into the second slot.

17. The electrical connector as claimed in claim 16, wherein the second piece is of an inverted U-shaped structure.

* * * * *